United States Patent
Weitze

(10) Patent No.: US 10,549,736 B2
(45) Date of Patent: Feb. 4, 2020

(54) VALVE ASSEMBLY FOR A PRESSURE CHANGE DAMPER FOR A BRAKING-FORCE-REGULATED, HYDRAULIC VEHICLE BRAKE SYSTEM, HYDRAULIC BLOCK FOR A VEHICLE BRAKE SYSTEM OF SAID TYPE, AND VEHICLE BRAKE SYSTEM HAVING A HYDRAULIC BLOCK OF SAID TYPE

(71) Applicant: Robert Bosch GmbH, Stuttgart (DE)

(72) Inventor: Thomas Weitze, Charleston, SC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/528,625

(22) PCT Filed: Oct. 19, 2015

(86) PCT No.: PCT/EP2015/074073
§ 371 (c)(1),
(2) Date: May 22, 2017

(87) PCT Pub. No.: WO2016/096188
PCT Pub. Date: Jun. 23, 2016

(65) Prior Publication Data
US 2017/0253222 A1    Sep. 7, 2017

(30) Foreign Application Priority Data
Dec. 16, 2014 (DE) .................. 10 2014 225 953

(51) Int. Cl.
*B60T 8/34* (2006.01)
*F16K 31/126* (2006.01)

(52) U.S. Cl.
CPC .......... *B60T 8/341* (2013.01); *F16K 31/1262* (2013.01)

(58) Field of Classification Search
CPC ............................ B60T 8/341; F16K 31/1262
(Continued)

(56) References Cited

U.S. PATENT DOCUMENTS 2,164,911 A * 7/1939 Garverick ............... F16K 17/00
137/596.2
7,144,091 B2 * 12/2006 Inage ...................... B60T 8/365
303/119.3
(Continued)

FOREIGN PATENT DOCUMENTS

DE    195 01 760 A1    7/1996
DE    101 55 392 A1    5/2003
(Continued)

OTHER PUBLICATIONS

International Search Report corresponding to PCT Application No. PCT/EP2015/074073, dated Jan. 11, 2016 (German and English language document) (5 pages).

*Primary Examiner* — Melanie Torres Williams
(74) *Attorney, Agent, or Firm* — Maginot, Moore & Beck LLP

(57) ABSTRACT

A valve assembly for a pressure change damper for a braking-force-regulated hydraulic vehicle brake system includes a valve housing, two valves, and a valve seat body. The valve housing includes an open side. The two valves are arranged in the valve housing. The valve seat body includes two valve seats for the two valves and is configured to close the open side of the valve housing.

10 Claims, 1 Drawing Sheet

(58) Field of Classification Search
USPC .................................................. 303/DIG. 10
See application file for complete search history.

(56) References Cited

U.S. PATENT DOCUMENTS

| | | | |
|---|---|---|---|
| 2009/0244234 A1* | 10/2009 | Shiohara | ................ B41J 11/002 347/102 |
| 2010/0319334 A1 | 12/2010 | Kley et al. | |
| 2011/0016824 A1* | 1/2011 | Thornton | ................ E04C 3/14 52/854 |
| 2012/0222759 A1* | 9/2012 | Knis | ................ F02M 37/0023 137/512.2 |
| 2012/0228925 A1* | 9/2012 | Baechle | ................ B60T 7/042 303/10 |
| 2014/0053928 A1* | 2/2014 | Berger | ................ F16K 1/443 137/614.11 |
| 2017/0138490 A1* | 5/2017 | Haeusser | ............ F16K 15/044 |

FOREIGN PATENT DOCUMENTS

| | | | | |
|---|---|---|---|---|
| DE | 10 2009 006 980 A1 | 8/2009 | | |
| DE | 10 2012 207 334 A1 | 11/2013 | | |
| EP | 0 407 721 A1 | 1/1991 | | |
| JP | 05196151 A | * | 8/1993 | ............. B60T 8/341 |
| JP | 11-509298 A | | 8/1999 | |
| JP | 2000-500414 A | | 1/2000 | |

\* cited by examiner

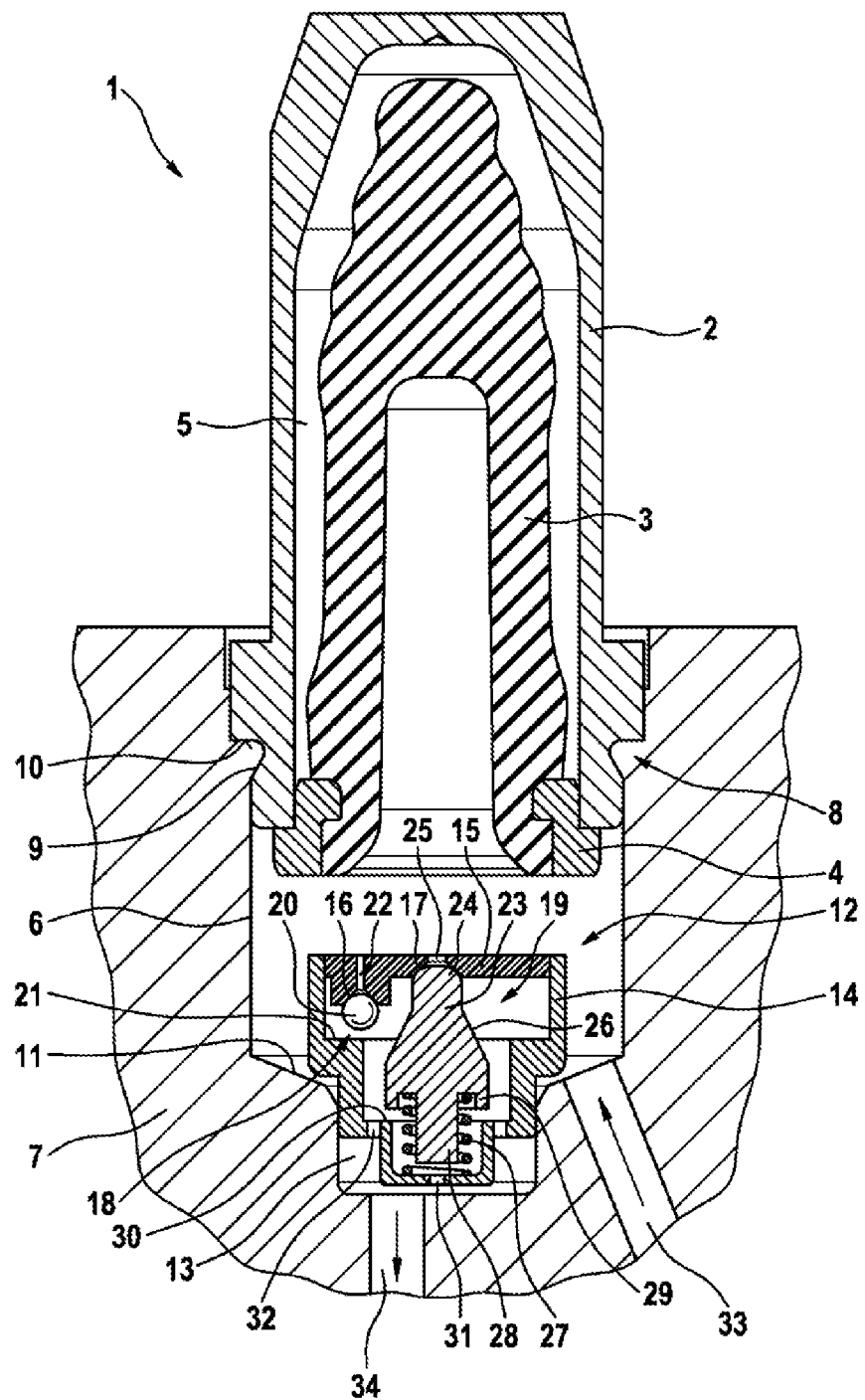

ated hydraulic vehicle brake system, a hydraulic block for a such a vehicle brake system, and a braking-force-regulated hydraulic vehicle brake system.

VALVE ASSEMBLY FOR A PRESSURE CHANGE DAMPER FOR A BRAKING-FORCE-REGULATED, HYDRAULIC VEHICLE BRAKE SYSTEM, HYDRAULIC BLOCK FOR A VEHICLE BRAKE SYSTEM OF SAID TYPE, AND VEHICLE BRAKE SYSTEM HAVING A HYDRAULIC BLOCK OF SAID TYPE

This application is a 35 U.S.C. § 371 National Stage Application of PCT/EP2015/074073, filed on Oct. 19, 2015, which claims the benefit of priority to Serial No. DE 10 2014 225 953.3, filed on Dec. 16, 2014 in Germany, the disclosures of which are incorporated herein by reference in their entirety.

The disclosure relates to a valve assembly for a pressure change damper for a braking-force-regulated hydraulic vehicle brake system, a hydraulic block for a such a vehicle brake system, and a braking-force-regulated hydraulic vehicle brake system.

BACKGROUND

Braking-force-regulated means that wheel brake pressures in the wheel brakes, and therefore braking forces of the wheel brakes of a hydraulic vehicle brake system, may preferably be regulated individually for each wheel, for example for an anti-lock braking system, a traction control system or dynamic stability control, which is also known in everyday language as an electronic stability program, automatic braking or adaptive cruise control, for which abbreviations such as ABS, ASR, DSC, ESP, ACC can be used. The list is exemplary and not conclusive. Such braking-force regulation systems are essentially known and will be discussed in more detail here. An example of a braking-force-regulated hydraulic vehicle brake system of this type is disclosed in patent application DE 195 01 760 A1.

Braking-force-regulated hydraulic vehicle brake systems normally have a hydraulic pump, usually a hydraulic pump in each brake circuit, which is also known as a return pump and is often a piston pump. Owing to their oscillating delivery, piston pumps cause pressure fluctuations in a brake fluid of a hydraulic vehicle brake system. Solenoid valves for wheel brake pressure regulation cause pressure surges in the brake fluid during switching. To damp such pressure changes in the brake fluid of a hydraulic vehicle brake system, pressure change dampers are known, which are intended to reduce both the noise generation and a backlash on a main brake cylinder.

SUMMARY

The valve assembly according to the disclosure is provided for a pressure change damper of a braking-force-regulated hydraulic vehicle brake system, which has a hydraulic pump, in particular a piston pump acting as a hydraulic pump, and a pressure change damper, which is hydraulically connected downstream of the hydraulic pump, i.e. to a pump outlet or a pressure side of the hydraulic pump. The valve assembly has a valve housing with an open side, two valves, which are arranged in the valve housing, and a valve seat body, which closes the open side of the valve housing and has two valve seats for shut-off bodies of the two valves. The disclosure enables the valve assembly to be manufactured and, in particular, assembled and functionally tested independently of the pressure change damper. Undergoing functional testing before being integrated in a hydraulic block is important because the valve assembly and other hydraulic components of a slip regulation system cannot be removed from a hydraulic block again after they have been inserted and are held and sealed in a pressure-resistant manner by caulking.

Advantageous embodiments and developments of the disclosure are provided by additional features of the descriptions, drawings, and claims.

The disclosure further relates to a hydraulic block for a braking-force-regulated hydraulic vehicle brake system having a receptacle in which a valve assembly of the type described above and a pressure change damper are arranged. Hydraulic blocks of this type for braking-force-regulated hydraulic vehicle brake systems are known. Please refer to laid-open application DE 10 2006 059 924 A1 by way of example. The hydraulic blocks are typically cuboidal, planar metal blocks, for example of an aluminum alloy. In elevation, they are usually rectangular, virtually square and approximately ¼ to ⅓ as high as they are wide or long. They have blind holes with stepped diameters for connecting brake lines to a main brake cylinder and to wheel brake cylinders and as receptacles for hydraulic components of the slip regulation system such as solenoid valves, hydraulic pumps, hydraulic accumulators and the pressure change damper already mentioned. The receptacles or the hydraulic components arranged in them are hydraulically connected to one another through a bore hole in the hydraulic block. Equipped with the hydraulic components, such a hydraulic block can also be perceived as a hydraulic power unit and regarded as the core piece of a hydraulic system of a braking-force regulation system. Furthermore, the valve assembly and the pressure change damper are each separate assemblies which are incorporated downstream of one another—the valve assembly first—in a designated receptacle of the hydraulic block and are mechanically held, and held together, by the hydraulic block. The pressure change damper is for example caulked in the hydraulic block and closes the receptacle in a pressure-tight manner.

The disclosure further relates to a braking-force-regulated hydraulic vehicle brake system having a hydraulic block of the type mentioned above.

BRIEF DESCRIPTION OF THE DRAWINGS

The disclosure is explained in more detail below with reference to an embodiment.

FIG. 1 shows a pressure change damper having a valve assembly according to the disclosure in an axial section.

DETAILED DESCRIPTION

The pressure change damper 1 illustrated in the drawing has a tubular housing 2 in which a hose-shaped damper element 3 made of an elastomer is arranged. The damper housing 2 is closed at one end and can also be perceived as dome-shaped. The damper element 3 is likewise closed at one end, wherein a closed end of the damper element 3 is arranged in a closed end of the damper housing 2 and an open end of the damper element 3 is held in an open end of the damper housing 2 by means of an annular holder 4. The damper element 3 has a smaller outer diameter than an inner diameter of the damper housing 2 so that a clearance 5 is produced between the damper element 3 and the damper housing 2, which clearance surrounds the damper element 3 in the damper housing 2 and is closed by the holder 4 at the open end of the damper housing 2 in a fluid-tight manner.

The open end of the damper housing 2 is pressed into a receptacle 6 in a hydraulic block 7, wherein the receptacle 6 is designed as a blind hole with a stepped diameter and only a fragment of the hydraulic block 7 in the region of the receptacle 6 is shown in the drawing. On the outside at its open end, the damper housing 2 is formed as a lead joint socket 8 for a self-clinch connection having a peripheral, cross-sectionally rounded groove 9 and, behind this in a pressing-in direction, an annular shoulder 10 which, when the damper housing is pressed into the receptacle 6 of the hydraulic block 7, works the material of the hydraulic block 7 which surrounds the receptacle 6 plastically into the groove 9 so that the damper housing 2 and, with the damper housing 2, the pressure change damper 1 are held in an altogether mechanically stable manner in the receptacle 6 of the hydraulic block 7 and sealed in a pressure-resistant manner. The damper housing 2 protrudes out of the hydraulic block 7.

At a base of the receptacle 6, a valve assembly 12 according to the disclosure is pressed at an annular step 11 into an extension 13 of the receptacle 6. The valve assembly 12 or a valve housing 14 of the valve assembly 12 seals the receptacle 6 at a periphery of the extension 13 of the receptacle 6. The valve housing 14 is a sleeve with a twice-stepped diameter, which is closed at an end having the small diameter and open at an end having the large diameter. A disk-shaped valve seat body 15 is arranged on or in an end of the valve housing 14 which has the large diameter and is connected in a fluid-tight manner to the valve housing 14 at the periphery by beading, pressing-in, adhesion or welding, for example laser welding. The valve seat body 15 has two hollow frustoconical valve seats 16, 17 for two valves 18, 19 arranged in the valve housing 14: near to the edge, the valve seat body 15 has a valve seat for a non-return valve 18 and, in the center, a valve seat 17 for a flow regulating valve 19. The non-return valve 18 is springless and has a ball 20 as a shut-off body 20, which cooperates with the valve seat 16. An annular shoulder 21 in the interior of the valve housing 14 is so near to the valve seat 16 that it holds the shut-off body 20 in a captive manner against the valve seat 16 when the shut-off body 20 lifts off the valve seat 16 as the non-return valve 18 is opened. Leading axially into the valve seat 16 is a hole, which passes through the valve seat body 15 and has a small diameter so that a throttle 22 is formed.

A shut-off body 23 of the flow regulating valve 19 has a calotte 24 which cooperates with the valve seat 17. A hole 25, which passes through the valve seat body 15, also leads into the valve seat 17 of the flow regulating valve 19. However, the hole 25 in the valve seat body 15 for the flow regulating valve 19 has a larger diameter than the throttle 22. At a spacing from the calotte 24, the shut-off body 23 of the flow regulating valve 19 has a frustoconical portion 26 downstream of a cylindrical portion. Together with the valve seat 17 and the hole 25, a geometry of the shut-off body 23, in particular the calotte 24, the frustoconical portion 26 and its spacing from the calotte 24, substantially determine a flow characteristic of the flow regulating valve 19, i.e. the dependence of a flow quantity on a pressure difference between both sides of the flow regulating valve 19.

A helical pressure spring as the valve spring 27, which is supported on the closed end of the valve housing 14, acts on the shut-off body 23 with pre-tension against the valve seat 17 so that the flow regulating valve 19 only opens when an opening pressure predetermined by a spring pre-tension is exceeded. A characteristic and the pre-tension of the valve spring 27 are likewise decisive for the flow characteristic of the flow regulating valve 19.

Opposite the calotte 24, the shut-off body 23 of the flow regulating valve 19 has a coaxial and cylindrical extension 28 which delimits an opening stroke of the shut-off body 23 in that it is seated on the closed end of the valve housing 14. The opening stroke is the travel for lifting the shut-off body 23 off the valve seat 17 when the flow regulating valve 19 is opened. Together with the extension 28, a hollow-cylindrical collar 29 is seated on an annular step 30 in the interior of the valve housing 14 when the flow regulating valve 19 is opened, which annular step likewise delimits the valve stroke. The extension 28 seated on the closed end of the valve housing 14 and the collar 29, which is at the same time seated on the annular shoulder 30 in the valve housing 14, can also be perceived as delimiting the opening travel of the flow regulating valve 19 or its shut-off body 23.

In its closed end, the valve housing 14 has a center hole for pressure compensation when the flow regulating valve 19 is opened and closed. If the flow regulating valve 19 is fully open, the collar 29 seated on the annular shoulder 30 and the extension 28 seated on the closed end of the valve housing 14 close the center hole 31, whereby a flow through the valve assembly 12 is reduced. In the annular shoulder 30, the valve housing 24 has a number of through holes 32 which are located outside the shut-off body 23 of the flow regulating valve 19 and are therefore always open.

For the inflow into the pressure change damper 1, the hydraulic block 7 has an inlet bore 33 which leads at an angle outside the valve housing 14 into the receptacle 6 at the annular step 11 and communicates with an interior of the hose-shaped damper element 3 through the open end. An outflow takes place through the two valves 18, 19 into an outlet bore 34 in the hydraulic block 7, which leads axially parallel to a base of the extension 13 of the receptacle 6.

The hydraulic block 7, of which only a fragment in the region of the receptacle 6 for the pressure change damper 1 and the valve assembly 12 is shown, has further receptacles for hydraulic components (not shown) of a braking-force regulation system of a hydraulic vehicle brake system, such as solenoid valves, non-return valves, hydraulic pumps and hydraulic accumulators, which are hydraulically connected to one another through a bore hole in the hydraulic block 7. Equipped with the hydraulic components, the hydraulic block 7 forms a hydraulic power unit of the braking-force regulation system of the hydraulic vehicle brake system (otherwise not shown). The hydraulic pump of the vehicle brake system is in particular a piston pump which, owing to its oscillating delivery, generates pressure pulsations in the delivered brake fluid, which are damped by the pressure change damper 1 and are further reduced when a flow passes through the throttle 22 and the valves 18, 19. The outflow flows through the two valves 18, 19, which are therefore outlet valves of the pressure change damper 1. The pressure change damper 1 and the valve assembly 12 communicate with a pressure side of the hydraulic pump (not shown) of the braking-force regulation system of the hydraulic vehicle brake system by means of the inlet bore 33. The pressure change damper 1 and the valve assembly 12 are connected to a division valve of the braking-force regulation system on the one hand and to inlet valves of wheel brakes of the vehicle brake system on the other by means of the outlet bore 34.

The wheel brakes are connected to the vehicle brake system by means of the inlet valves and the vehicle brake system is connected to a main brake cylinder by means of the division valve. The two valves 18, 19 are hydraulically connected in parallel.

The invention claimed is:

1. A valve assembly for a pressure change damper for a braking-force-regulated hydraulic vehicle brake system, comprising:
    a valve housing including an open side;
    two valves arranged in the valve housing, the two valves including a first type of valve and a second type of valve; and
    a valve seat body including two valve seats for the two valves and configured to close the open side of the valve housing, wherein
        the first type of valve is a type of valve that is different from the type of valve of the second type of valve, and
        the valve seat body is a disk-shaped plate.

2. The valve assembly as claimed in claim 1, wherein the two valves are outlet valves of a pressure change damper.

3. The valve assembly as claimed in claim 1, wherein the valve housing is a sleeve possessing a stepped diameter.

4. The valve assembly as claimed in claim 1, wherein:
    the valve seat body is a plate; and
    the two valve seats are arranged adjacent to each other.

5. The valve assembly as claimed in claim 1, wherein a first valve of the two valves is a non-return valve and a second valve of the two valves is a flow regulating valve.

6. The valve assembly as claimed in claim 5, wherein the flow regulating valve is configured to open only when an opening pressure is exceeded.

7. The valve assembly as claimed in claim 5, wherein:
    the flow regulating valve has an opening-travel delimiting device; and
    the flow regulating valve is configured to shut off a valve passage when the flow regulating valve is fully open.

8. The valve assembly as claimed in claim 5, wherein a first diameter of the valve seat associated with the non-return valve is smaller than a second diameter of the valve seat associated with the flow regulating valve.

9. A valve assembly for a pressure change damper for a braking-force-regulated hydraulic vehicle brake system, comprising:
    a valve housing including an open side;
    two valves arranged in the valve housing, the two valves including a first type of valve and a second type of valve; and
    a valve seat body including two valve seats for the two valves and configured to close the open side of the valve housing, wherein
        the first type of valve is a type of valve that is different from the type of valve of the second type of valve,
        a first valve of the two valves is a non-return valve and a second valve of the two valves is a flow regulating valve,
        the flow regulating valve has an opening-travel delimiting device; and
        the flow regulating valve is configured to shut off a valve passage when the flow regulating valve is fully open.

10. A valve assembly for a pressure change damper for a braking-force-regulated hydraulic vehicle brake system, comprising:
    a valve housing including an open side;
    two valves arranged in the valve housing, the two valves including a first type of valve and a second type of valve; and
    a valve seat body including two valve seats for the two valves and configured to close the open side of the valve housing, wherein
        the first type of valve is a type of valve that is different from the type of valve of the second type of valve,
        a first valve of the two valves is a non-return valve and a second valve of the two valves is a flow regulating valve, and
        a first diameter of the valve seat associated with the non-return valve is smaller than a second diameter of the valve seat associated with the flow regulating valve.

* * * * *